United States Patent [19]
Gill et al.

[11] Patent Number: 5,971,765
[45] Date of Patent: Oct. 26, 1999

[54] METHOD AND SYSTEM FOR GENERATING ARTIFICIAL TORNADOES AND RELATED VORTEX PHENOMENA

[75] Inventors: James Gill, Glendale; Dylan Hixon, Hollywood; James Lux, Westlake Village; Martin Becker, Glendale, all of Calif.

[73] Assignee: Reel Efx, Inc., North Hollywood, Calif.

[21] Appl. No.: 08/621,060

[22] Filed: Mar. 22, 1996

[51] Int. Cl.$^6$ ....................................... B04C 3/00
[52] U.S. Cl. ................. 434/217; 95/271; 472/65
[58] Field of Search ............... 434/217; 95/267, 95/269, 270, 271, 272; 467/473; 96/372; 472/65

[56] References Cited

U.S. PATENT DOCUMENTS

| | | | |
|---|---|---|---|
| 3,589,044 | 6/1971 | Morrison | 40/407 |
| 3,641,743 | 2/1972 | Hoffmann et al. | |
| 3,744,220 | 7/1973 | Klein | 55/261 |
| 4,070,131 | 1/1978 | Yen | 415/4.4 |
| 4,157,368 | 6/1979 | Fernandes | |
| 4,258,912 | 3/1981 | Reighart | 472/65 |
| 4,452,562 | 6/1984 | Hsu | 415/208.1 |
| 5,096,467 | 3/1992 | Matsui | 95/269 |
| 5,322,646 | 6/1994 | Wright et al. | 261/79.2 |

OTHER PUBLICATIONS

Davies–Jones, "Laboratory Simulations of Tornadoes", Proceedings of the Symposium on Tornadoes, pp. 151–173, Am. Met. Sty (U.S.A. 1976).

Church et al., "Laboratory Models of Tornadoes", The Tornado, Structure . . . , Geophysical Monograph 79, pp. 277–295, American Its Geophysical Union, 1993.

Davies–Jones, "Tornadoes", Scientific American, pp. 48–53, 56–57, (Aug. 1995).

Oppenheimer, "Working Prototypes, Exhibit Design at the Exploratorium", © 1986 the Exploratorium.

Experiments in Meteorology, Investigation 17, Model of a Tornado Vortex L.W.Trowbridge, Doubleday & Co Inc, NY, 1973.

The Amateur Scientist, How to make and investigage vortexes in water and flame, conducted by C.L. Strong. 1963.

Primary Examiner—Glenn E. Richmon
Attorney, Agent, or Firm—James Creighton Wray; Meera P. Narasimhan

[57] ABSTRACT

A system and method for generating tornadoes and other vortex phenomen in an open air, free space enviroment is disclosed. The system includes a flat surface or deck suspended above the ground, a circular hole in the center of the deck, a means for creating an updraft through the hole in the deck and fans or other air moving means for creating a swirling air flow. Preferably, the fans for swirling the air are angled approximately 45 degrees relative to the vertical axis of the updraft flow through the center hole. For swirling the air at higher elevations, as well as at ground level, a multi level fan arrangement having the layers of fans spaced relative to the deck is used. Alternatively, a single level of fans are used in conjunction with louvers or vanes for deflecting the blown air into a fan shape. In another embodiment of the present invention, tangential flow is established by using a multiplicity of tubes for returning air flow from a plenum above an updraft fan. Higher elevation air swirling is accomplished by providing vents in the return columns along the entire length. The vents can be holes in the columns or arrangements of adjustable or fixed vanes. Controls, including valves and shutters, are positioned in the return tubes for adjusting air flow patterns. The present system and method does not require containing chambers to remove external perturbations and to constrain air flow, actively, as opposed to passively, creates the swirling tangential flow, can be operated or performed indoors or outdoors and works with an asymmetric air flow.

79 Claims, 9 Drawing Sheets

METHOD AND SYSTEM FOR GENERATING ARTIFICIAL TORNADOES AND RELATED VORTEX PHENOMENA

BACKGROUND OF THE INVENTION

This invention relates to systems and methods for generating tornadoes and other vortex phenomena.

Existing laboratory apparatus for creating vortices that are geometrically and dynamically similar to natural tornadoes have proven inadequate. Existing tornado simulators rely on passive techniques for developing the swirling air flow. An apparatus developed in the 1960's by Ward creates a swirling flow by injecting vorticity into a sink flow. A rotating cylindrical meshwire is used to spin the air as the air enters a lower compartment of the tornado vortex chamber. Other simulators, including the Purdue simulator developed by Snow, have modified the Ward simulator, but have maintained the passive generation of swirling air flows. Needs exist for simulators that generate swirling tangential flows using active means, as opposed to passive ones.

In existing simulators, tornado-like vortices are created in tornado vortex chambers. Containing walls are included to remove external perturbations, to constrain the airflow's and to ensure accuracy of experimental results. Existing vortex separators are operated in closed chambers of one kind or another and prevent any exposure or use of external open air. Needs exist for tornado simulators that are functionally effective in the absence of containing walls or chambers and that use the open air in their operation.

Existing vortex simulators require a symmetric inflow. That requirement limits potential applications for the simulators and increases design costs. Using symmetric air flows, lower quality and less stable vortices are produced. Needs exist for simulators that are effective using asymmetric air inflows.

Artificially-generated tornadoes and other vortex phenomena are important in the fields of materials and structural testing. Through understanding the structures, dynamics and intensities of atmospheric vortices, scientists and engineers become better able to design structures and materials that protect individuals during tornadoes and similar phenomena. Needs exist for simulators that create vortices on the same scale and intensities as naturally occurring tornadoes to provide meaningful measurements and observations.

People are intrigued and fascinated by tornadoes and other smaller-scale atmospheric vortices. Needs exist for methods and apparatus for generating controlled vortices for use in entertainment, amusement and educational settings that are inexpensive, realistic and transportable.

SUMMARY OF THE INVENTION

Tornadoes and other vortex phenomena are achieved in an open air, free space environment. No closed wall system or tornado vortex chamber is required, and external air is drawn into the vortex along with the tangential flow. No obstructions, other than means for suspending a flat surface, is needed. The system and method are effective for use indoors and outdoors.

The system includes a flat surface such as a roof or deck suspended above the ground or floor, a means for generating an updraft through a hole in the flat surface and a means for creating a swirling air flow. The flat surface has dimensions approximately equal to its height of suspension. A hole is positioned in the flat surface. In preferred embodiments, the hole is circular and has a diameter that is approximately half of the diameter of the flat surface or smaller. The swirling air flow is created using fans or other air movers placed beneath the surface and around the area.

The fans or air movers do not need to be symmetrically disposed. Asymmetric arrangements, such as a semi-circular arrangement, are possible. Unlike existing systems and methods, the present invention allows for the use of asymmetric air flows for producing higher quality and extremely stable vortices.

For swirling the air at higher elevations as well as at ground level, multi-level fan arrangements are used. In one embodiment, a first set of fans is positioned near the floor and a second set of fans is positioned between the first set of fans and the flat surface. While numerous configurations are possible, a preferred configuration places the second level of fans on supports that are approximately halfway between the flat surface and the ground and angling the fans inward.

The air can also be swirled at higher elevations using a single set of fans and flow deflectors, such as louvers or vanes. The deflectors deflect the air stream into a fan shape, with the long axis of the fan vertical.

Preferably, the fans or air movers are angled approximately 45 degrees relative to a line from the fans to the center of the updraft hole. At low updraft flows, pointing the fans more centrally improves results. The total flow from the tangential fans is preferably comparable to the flow through the updraft hole. The tangential fans provide diffuse air movement, as opposed to a tight beam.

More than one fan may be mounted in an opening in the surface. For example, three fans may be mounted in a triangular arrangement, four fans in a square arrangement or six fans in a hexagonal arrangement around a seventh central fan. Heaters or flames may replace the fans.

Another means for generating the tangential flow includes the use of multiple tubes for returning the exiting air from a plenum positioned above the updraft mechanism. Some, if not all of the air pulled through the hole in the flat surface is exhausted to the surrounding environment. A fraction of the air can be returned to the area between the ground and the flat surface through tangential ports. Swirl is imparted on the updraft air flow by providing vents at the bottoms of the return columns or along their entire lengths. The vents can be as simple as holes in the columns or more complex, such as intricate arrangements of adjustable or fixed vanes. Additional fans or air movers may be positioned in or on the columns for changing air flow distribution. In addition, the return columns may have controls, such as valves or shutters, to allow for adjustment of the airflow patterns, which in turn affect the produced vortex.

The updraft necessary for creating the vortex is produced by one or more fans, high speed blowers such as a jet engines, or burners. The burners, when positioned above the vortex, draws the air upward and into the burners from below. When positioned below the vortex, the hoc air directly rises in a bouyant plume. Jet engine exhaust may be directed horizontally and then deflected upwardly to create a large updraft.

The vortex itself can be created by igniting a pool of flammable liquid or powdered solid and generating a swirling air flow by surrounding the pool with an appropriate arrangement of fans.

The present invention has numerous applications, including still and moving photographic applications, materials and structure testing and entertainment and amusement applications. By placing a fine spray or mist of water in the swirling air, the vortex is visualized and can be used for cooling off people who are in the middle of the vortex or walking through the vortex. The vortex can also be visualized by introducing a flammable liquid or gas and then igniting it, or by feeding a variety of already burning substances, such as powders, liquids and gases, into the vortex.

The present invention can be operated or performed in any orientation, including upside down. Upside down operation of the present invention is accomplished using a downward suction with the same tangential fan arrangement as used in the right side up configurations. A double ended phenomena is possible by using two suction orifices pulling apart and placing tangential fans midway between the suctions.

A system for generating artificial tornadoes and other vortex phenomena in an open air, free space environment includes a first surface, a second surface positioned above the first surface, a hole positioned in the second surface, an updraft mechanism for creating an updraft air flow through the hole and at least one air moving mechanism for creating a tangential flow that converts the updraft flow into a swirling flow. Preferably, the first surface is a ground surface and the second surface is a flat surface that is positioned generally parallel to the ground.

In preferred systems, the second surface is a generally circular surface and the hole is generally circular and has a diameter that is about half of a diameter of the second surface.

In one embodiment, he updraft mechanism is at least one fan positioned in the hole in the second surface and oriented for producing a substantially vertical updraft air flow through the hole. Preferably, the mechanism is a hexagonal or square array of fans positioned in the hole in the second surface.

In another preferred embodiment, the updraft mechanism is a burner positioned in or around the hole in the second surface and oriented for producing a substantially vertical updraft air flow through the hole. The burner may also be positioned below a generated vortex.

In another preferred embodiment, the updraft mechanism is at least one high speed blower positioned adjacent the hole above the top side for drawing air upward through the hole. The blower can be a jet engine, and turning vanes are positioned above the hole between the blowers for directing air flow from the blower upward.

The second surface has a top side and a bottom side. The bottom side is closest to the first surface. In preferred embodiments, the second surface has a duct extending upward from the top side of the second surface around a perimeter of the hole for exhausting the updraft air flow.

The air moving mechanism is preferably an asymmetrical array of fans. each fan in the array is preferably angled at about 45 degrees relative to a line from the fan to a center of the hole. In one embodiment, the air moving mechanism includes a first set of tangential fans positioned between the first surface and the second surface. The fans are symmetrically arranged in a generally circular pattern or asymmetrically arranged in a generally arc-shaped configuration or an inwardly spiraling configuration.

For swirling air at both ground level and at higher elevations, the system includes, along with the first set of fans, a second set of fans positioned between the first set of fans and the first surface. The first set of fans is positioned about half way between the first surface and the second surface, and the second set of fans is positioned close to the first surface. Alternately, a single level of fans are used. The single level of fans are angled upward and deflectors are positioned in front of the fans for directing air streams from the fans into a far shape. The directors are louvers and vanes.

In another embodiment of the system, the second surface is a plenum and the updraft mechanism is positioned underneath the plenum. The system has an air return system that includes columns extending downward from the plenum for delivering a circulated air flow to the area between the first and second surfaces. Vents are positioned in the columns for imparting a swirled, draft between the first and second surfaces. The vents are preferably holes in surfaces of the columns, adjustable vanes or fixed vanes. An air exhaust is positioned at a top of the plenum for releasing a part of the updraft air flow to the surrounding environment. Additional air movers are positioned in or on the columns for altering air flow distribution. Obstructors, such as valves or shutters, are positioned in the columns for adjusting and controlling air flow patterns.

The method for generating tornadoes and other vortex phenomena in an open air, free space environment includes the steps of positioning above a first surface a second surface having a hole, creating an updraft flow through the hole in the second surface, drawing external air into the updraft flow, creating a swirling flow by affecting the updraft flow with tangential flows from air moving generators and exhausting at least part of the updraft flow to the open environment after the updraft flow exits the hole. Creating an updraft flow is preferably accomplished by placing at least one fan near the hole. Alternatively, the updraft is created by positioning a burner above or below the generated vortex. In another embodiment, the updraft flow is created by positioning at least one blower above the top side of the second surface adjacent the hole and orienting directors above the hole for directing air flow from the at least one blower upward.

In an alternative embodiment of the present invention, an upward flow is created by igniting a pool of flammable liquid and surrounding the pool with fans oriented to create an upward, swirling flow.

In a preferred embodiment, the method includes recirculating part of the updraft air flow from a plenum positioned above the updraft mechanism. Recirculating part of the air includes extending multiple return columns downward from the plenum towards the first surface, directing part of the updraft air flow through the plenum and down the columns, and returning the part of the updraft air flow to an open area between the first surface and second surface through vents in the columns. Recirculation further includes delivering tangential air flow to the updraft air flow at an angle generally perpendicular to the updraft flow. Air flow distribution in the columns is altered by using additional fans or air movers in the columns. Air flow patterns are adjusted by positioning obstructers in the columns. The obstructors are controlled for permitting or retarding air passage.

Creating a swirling flow includes positioning a first set of fans between the first and second surfaces and imparting an asymmetrical, tangential flow on the updraft air flow.

The first set of fans are positioned near the floor, and a second set of fans are placed between the first set of fans and the second surface and to impart a second tangential flow on the updraft air flow. The second set of fans are placed supports at a point preferably about halfway between the first and second surfaces.

The generated vortex can be visualized by spraying a mist into the swirling flow, by introducing a flammable substance into the swirling flow and igniting the swirling flow, and by introducing already burning substances into the swirling flow.

It is understood that the scope of the present invention includes any working fluid and any means for actively inducing swirls. The descriptions having air as the working fluid and fans for inducing swirl are provided for exemplary purposes only and do not serve to limit the scope of that which applicant considers the invention.

These and further and other objects and features of the invention are apparent in the disclosure, which includes the above and ongoing written specification, with the claims and the drawings.

DETAILED DESCRIPTION OF THE PREFERRED EMBODIMENTS

Figure 1:
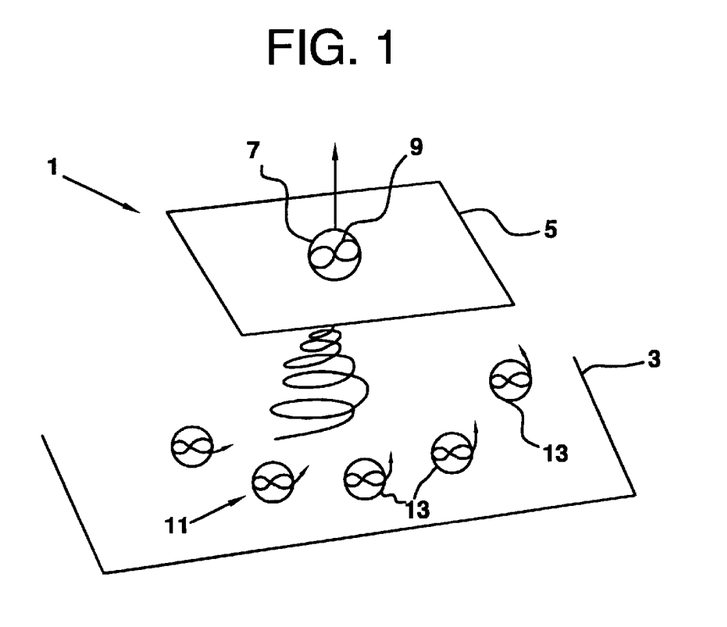
FIG. 1 schematically shows a system for generating artificial tornadoes and related vortex phenomena including a flat upper surface having a central hole, a lower surface, an updraft fan positioned beneath the hole and an array of fans asymmetrically arranged between the upper and lower surfaces.

As shown in FIG. 1, a system 1 for generating artificial tornadoes and another vortex phenomena in an open air, free space environment includes a first surface 3 and a second surface 5 positioned above the first surface 3. A hole 7 is positioned in the second surface 5. An updraft mechanism 9 for creating an updraft air flow throught the hole 7 is positioned near the hole 7. The updraft mechanism 9 is preferably inside the hole 7 or directly beneath the hole 7. At least one air moving mechanism 11 for creating tangential flows is positioned between the first surface 3 and the second surface 5 for influencing the updraft flow as a swirling flow. As shown in FIG. 1, the air moving mechanism 11 preferably is an array of fans 13 asymmetrically oriented around the updraft flow.

The first surface 3 is preferably the ground or floor. A temporary first surface may also be installed.

Figure 2:
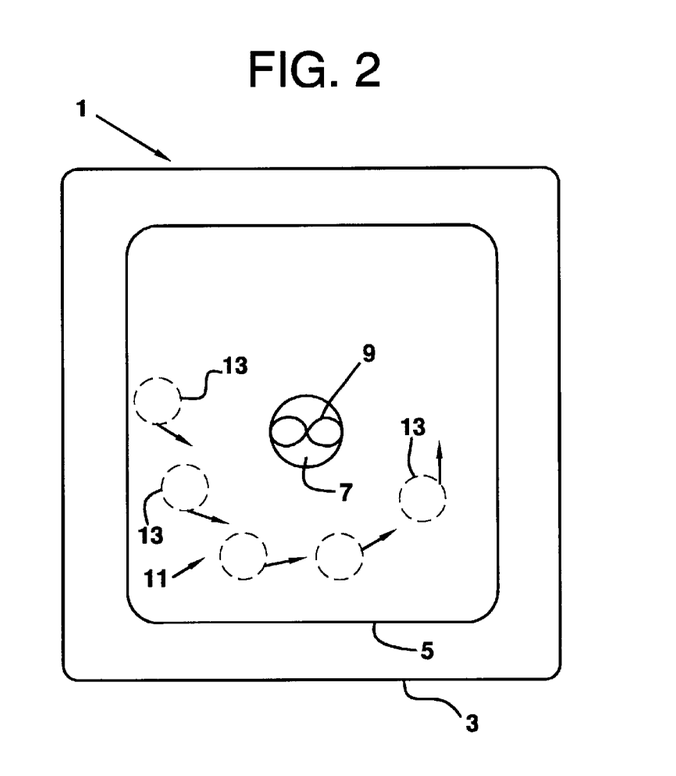
FIG. 2 is a schematic plan view of the system of FIG. 1.
Figure 3:
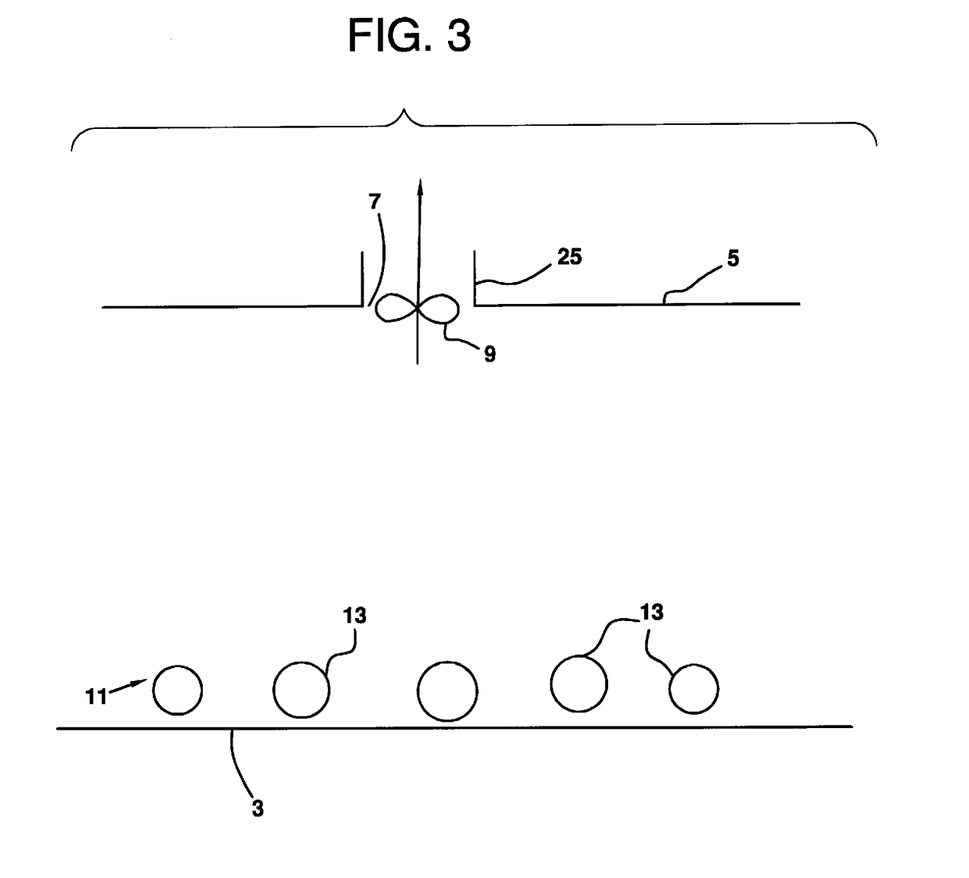
FIG. 3 is a schematic side view of the system of FIG. 1.

As show in FIGS. 1–3, the second surface is preferably a flat surface, such as a deck, that is positioned generally parallel to the first surface 3. Preferably, the second surface 5 is square, rectangular or circular.

The hole 7 in the second surface 5, which is preferably a circular or square hole, is generally positioned in the center of the second surface 5. In a preferred embodiment, the second surface 5 is a generally flat surface, and the hole 7 is generally circular and has a diameter that is about half the diameter of the second surface 5 or smaller.

The air moving mechanism 11 is preferably an array of fans 13 arranged asymmetrically around the generated updraft air flow. FIGS. 1–3 show one embodiment of the present invention where the array of fans 13 has a generally semi-circular configuration. Each fan 13 in the array is oriented to provide a tangential air flow to affect and swirl the generated updraft flow. As shown in FIG. 3, the array of fans 13 are preferably positioned slightly above or on the first surface 3. In a preferred embodiment, each fan 13 in the array is angled at about 45 degrees relative to a line from the fan 13 to a center of the hole 7.

Figure 9:
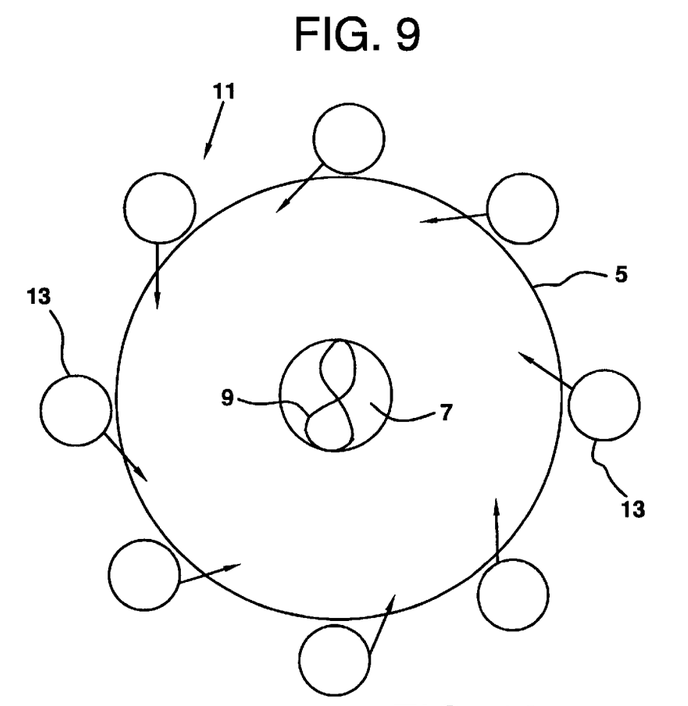
FIG. 9 shows one embodiment of the present invention having a circular array of fans as the air swirling mechanism.
Figure 10:
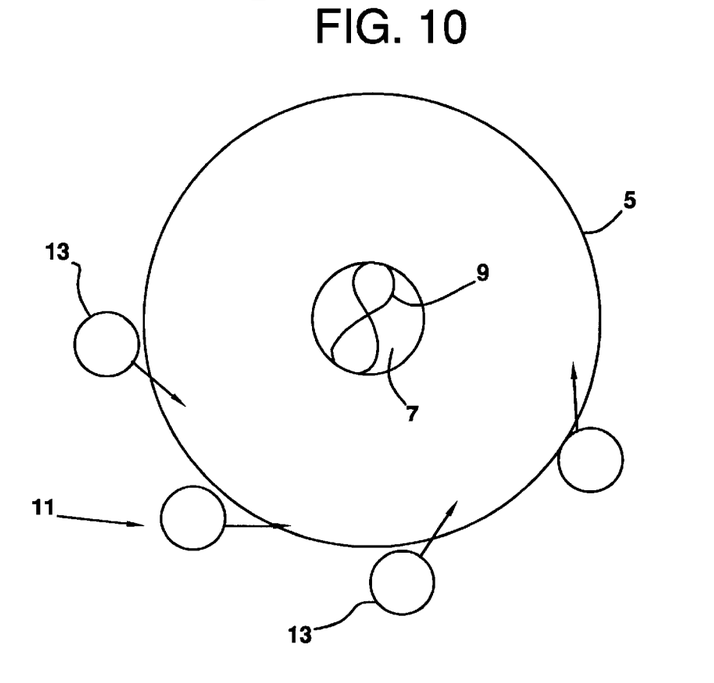
FIG. 10 shows another embodiment of the present invention having a generally semi-circular array of fans as the air moving mechanism.
Figure 11:
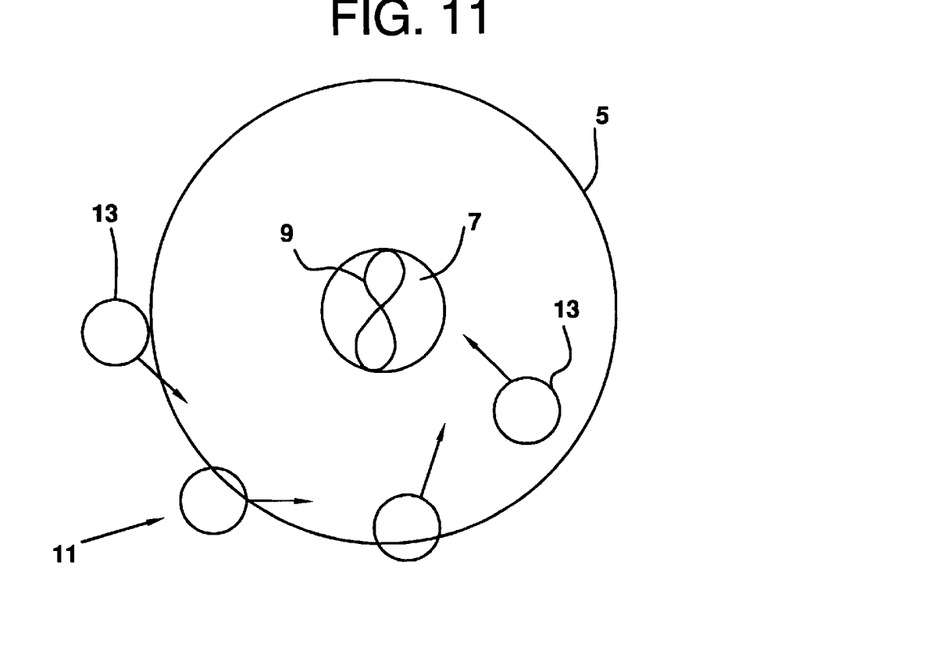
FIG. 11 shows another embodiment of the present invention having an inwardly-spiraling array of fans as the air moving mechanism.

FIGS. 9–11 show preferred arrangements for the array of air movers or fans. FIG. 9 shows a symmetrical configuration wherein the fans 13 are arranged in a generally circular pattern. FIG. 10 shows the set of fans 13 asymmetrically arranged in a generally arc-shaped configuration. FIG. 11 shows the set of fans 13 are asymmetrically arranged in a generally arc-shaped, inwardly spiraling configuration. Other configurations are possible.

Figure 4:
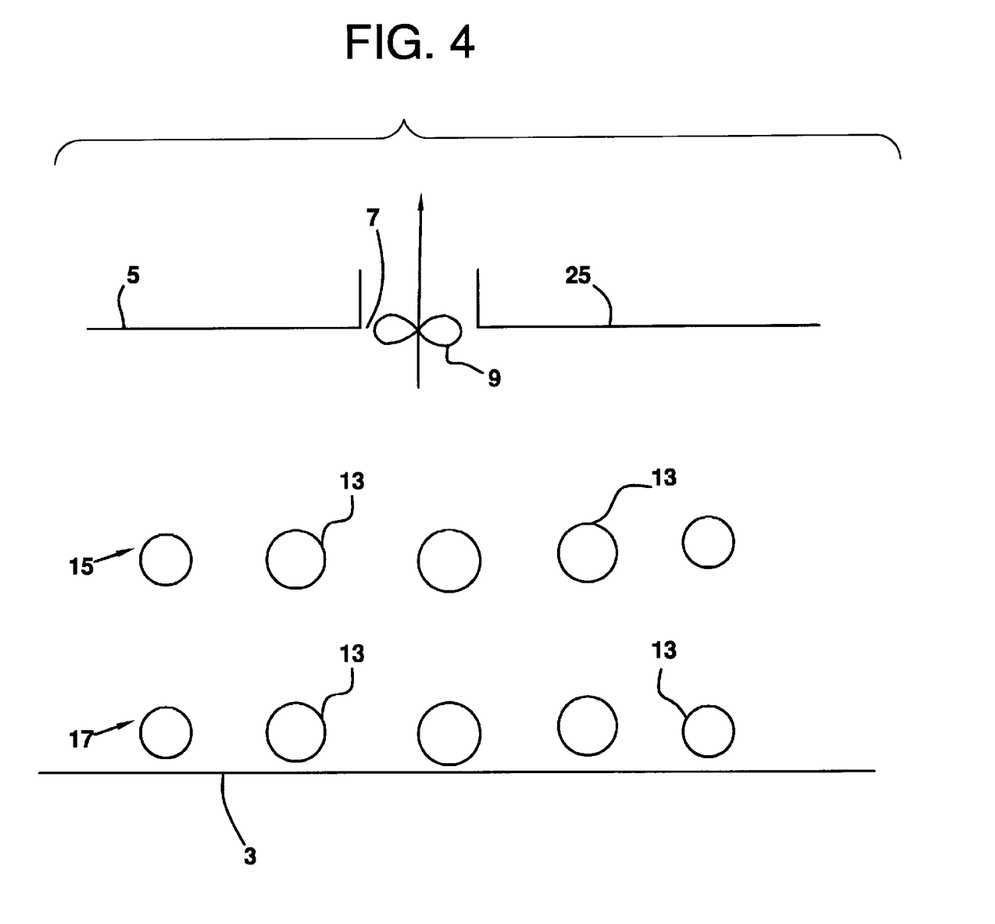
FIG. 4 is a schematic side view of a system for generating artificial tornadoes and related vortex phenomena that includes two levels of fans for swirling the air at high and low elevations.

As shown in FIG. 4, for swirling the air at higher elevations as well as at ground level, a second set 15 of fans 13 is positioned between the first set 17 of fans 13 and the first surface 3. In a preferred embodiment, the second set 15 of fans 13 is positioned about half way between the first surface 3 and the second surface 5, and wherein the first set 17 of fans 13 is positioned close to the first surface 3. More than two levels of fans symmetrically or asymmetrically arranged may also be used for swirling the updraft air flow.

When a single level of fans is used, deflectors are positioned in front of the fans for directing air streams from the fans into vertically elongated fan shapes. That allows for swirling at higher elevations as well as at ground level. The directors are preferably louvers and vanes.

Figure 5:
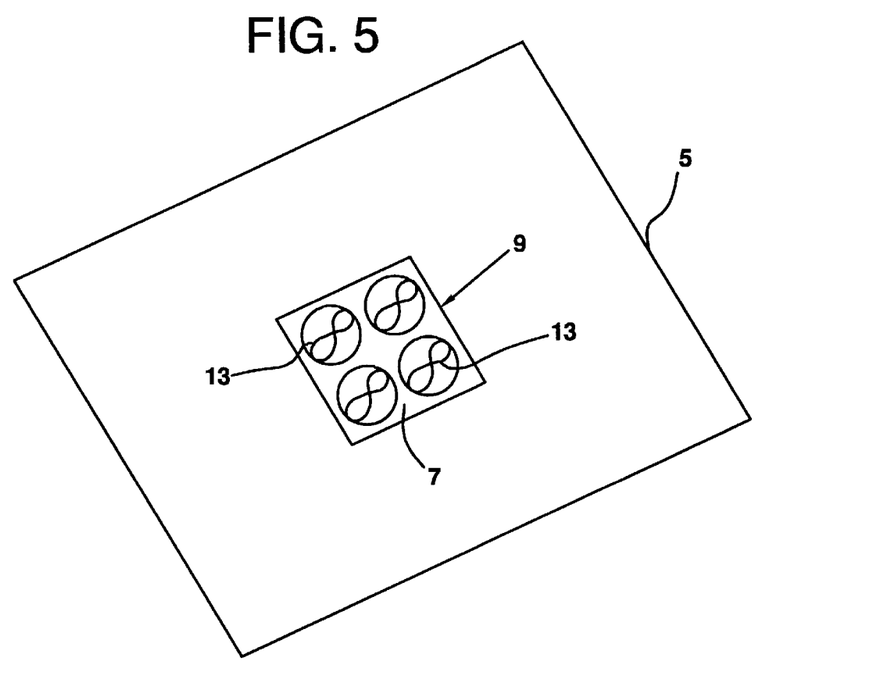
FIG. 5 shows one embodiment of the present invention having a square array of fans as the updraft mechanism.
Figure 6:
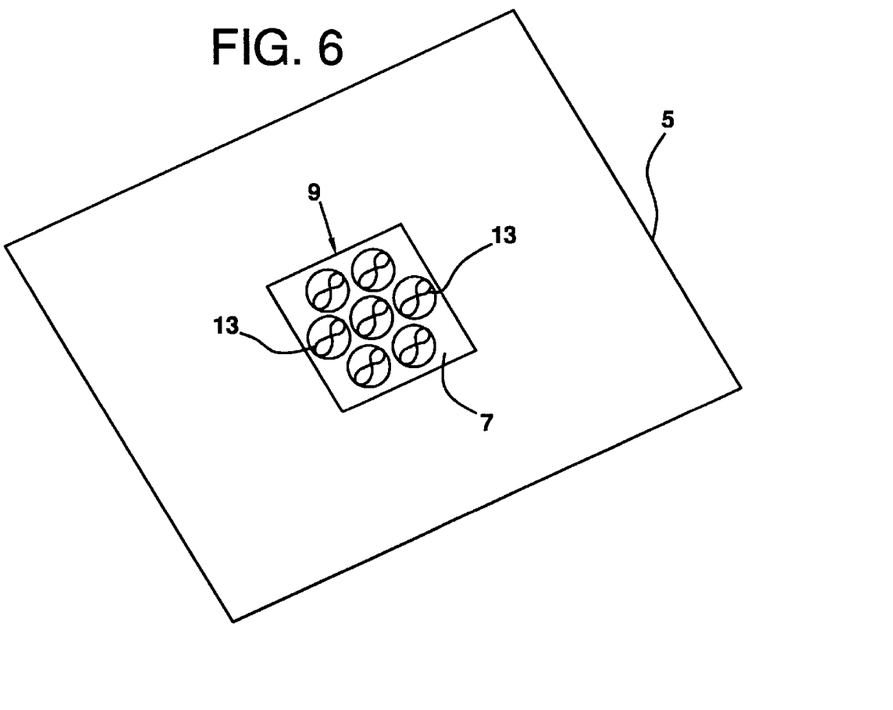
FIG. 6 shows another embodiment of the present invention having a central and hexagonal array of fans as the updraft mechanism.

FIGS. 5–8 show preferred embodiments of the updraft mechanism 9 of the present system 1. FIG. 5 shows a first embodiment wherein the updraft mechanism 9 is a square array of fans 13. FIG. 6 shows a second preferred embodiment of the present system 1 having a hexagonal array of fans 13 as the updraft mechanism 9.

Figure 7:
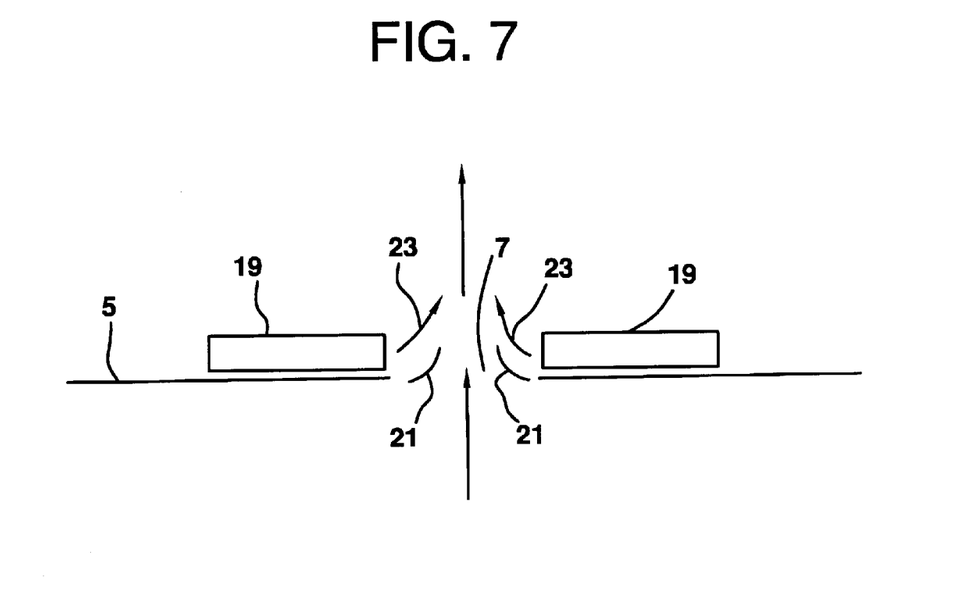
FIG. 7 shows another embodiment of the present invention having blowers and deflectors positioned above the hole in the upper surface as the updraft mechanism.

FIG. 7 shows a third preferred embodiment of the present system 1 having blowers 19 positioned above the hole 7 in the second surface 5 as the updraft mechanism 9. The blowers 19 are preferably jet engines or other high speed blowers. Deflectors 21 are positioned adjacent the exit air flow 23 from the blowers 19 for directing the air flow upward. Preferably, a duct wall 25 is positioned above the upper surface 5 for funneling the updraft air flow.

Figure 8:
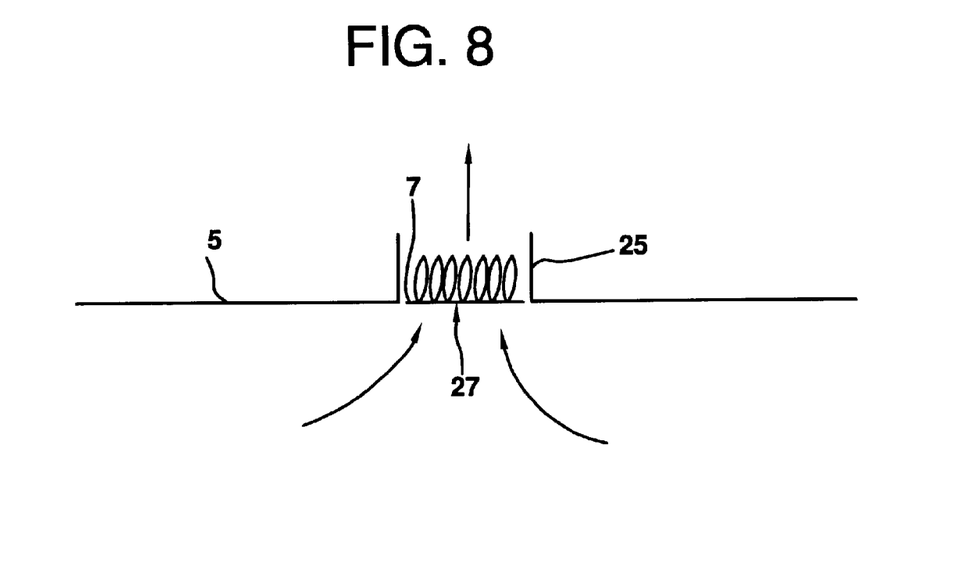
FIG. 8 shows another embodiment of the present invention having burners positioned in the hole in the upper surface as the updraft mechanism.

FIG. 8 shows a fourth preferred embodiment of the present system 1 having a burner 27 as the updraft mechanism 9. The updraft necessary for creating the vortex is produced by positioning the burner 27 either below or above the vortex. When positioned below the vortex, the hot air directly rises. When the burner is positioned above the vortex, as shown in FIG. 8, the updraft air flow is created by drawing air into the burner 27 from below.

Figure 12:
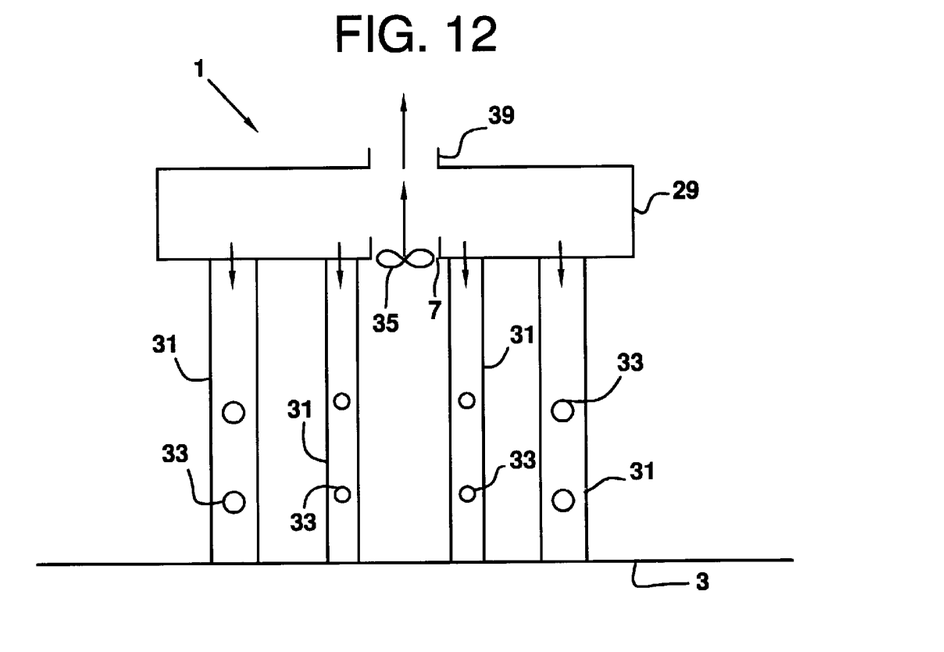
FIG. 12 is a cross sectional view of a preferred embodiment of a system for generating artificial tornadoes and realtived vortex phenomena including a plenum, return columns having air vents, an updraft fan, and an exhaust chute.
Figure 13:
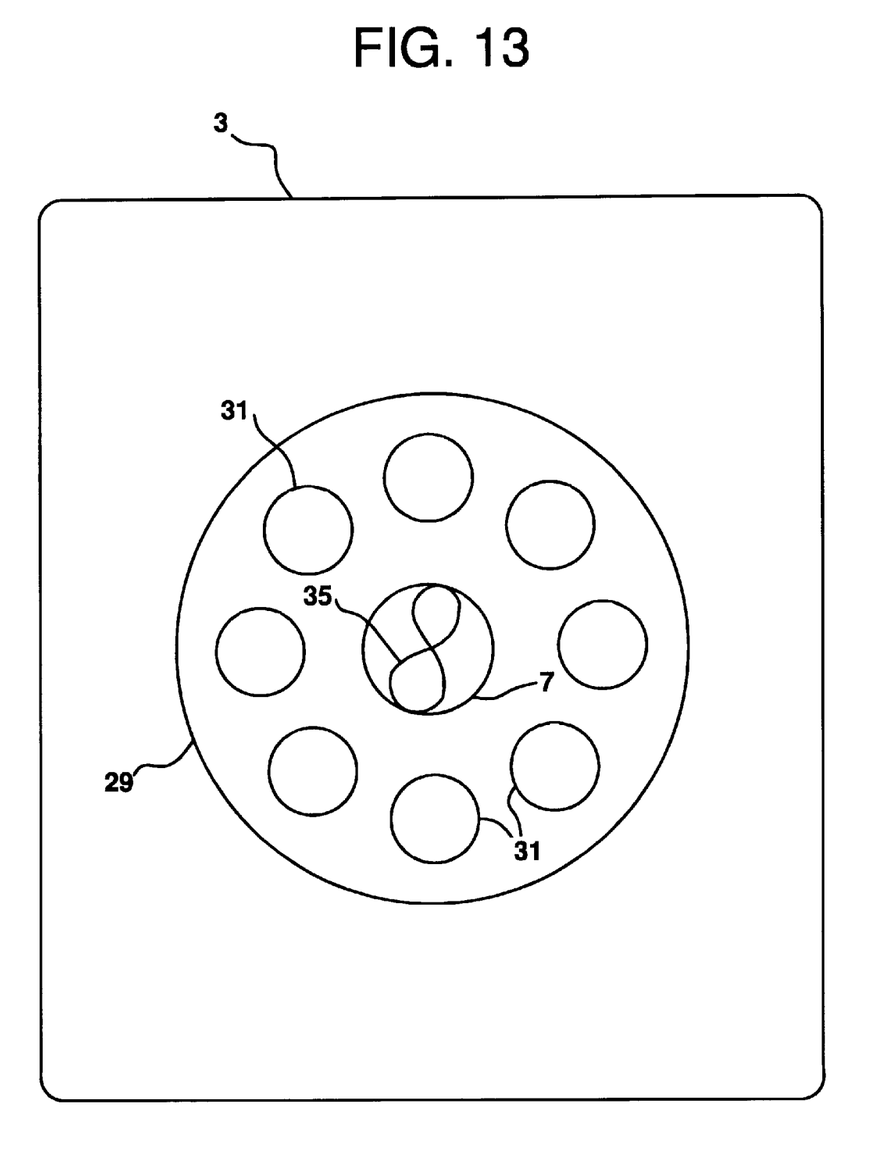
FIG. 13 is a plan view of the system of FIG. 12.

FIGS. 12 and 13 show a preferred embodiment of a system for generating artificial tornadoes and related vortex phenomena including a plenum 29, return columns 31 having air vents 33, an updraft fan 35 and an exhaust chute 37. The return columns 31 extend downward from the plenum 29 toward the first surface 3 or ground. Some, if not most, of the air pulled through the updraft hole 7 is exhausted to the surrounding environment through the exhaust chute 37. A small percentage of the updraft air flow proceeds into the return columns 31. Vents 33 are provided in the return columns 31 for imparting a swirl on the updraft air flow between the plenum 29 and the ground 3. Preferably, the vents 33 run along the entire length of the columns 31. Many forms of vents 33 are possible, including simple holes in the columns 31 as well as more complex arrangements of adjustable or fixed vanes.

Figure 14:
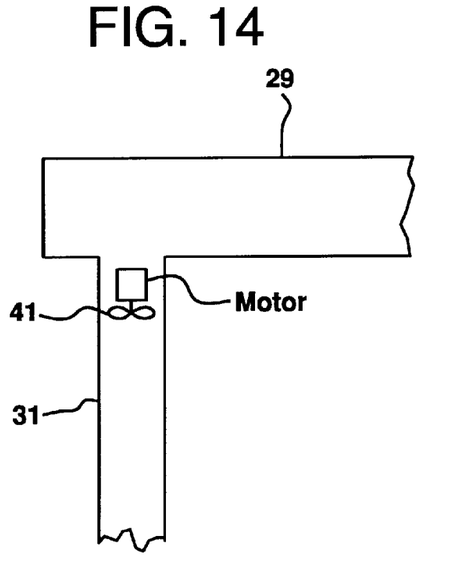
FIG. 14 is a detail of a return column having a fan for altering air flow distribution.
Figure 15:
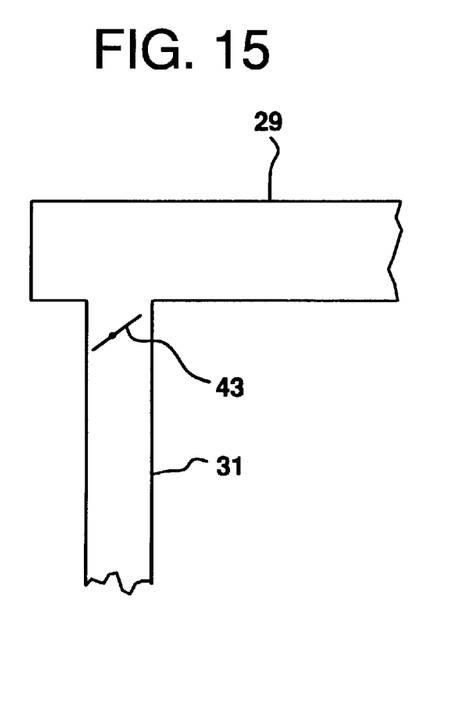
FIG. 15 is a detail of a return column having an obstructor valve positioned in the column for adjusting air flow patterns.

While a single updraft mechanism, such as a fan, can provide both the updraft air flow and the air flow directed down the return columns, additional air flow adjusters can be included. FIG. 14 shows one embodiment of the present system wherein additional fans 41 or air movers are positioned in or on the return columns 31 for adjusting the air flow distribution. FIG. 15 shows another adjustment mechanism that includes controls 43 in the form of valves or shutters for controlling air flow patterns.

The present disclosure provides descriptions having air as the working fluid. It is understood, however, that all embodiments can use other working fluids, including any gas or liquid. Similarly, any means of actively inducing swirl is included in the scope of the present invention.

While the invention has been described with reference to specific embodiments, modifications and variations of the invention may be constructed without departing from the scope of the invention which is defined in the following claims.

We claim:

1. A system for generating artificial tornadoes and other vortex phenomena in an open air, free space environment comprising a first surface, a second surface positioned above the first surface, a hole positioned in the second surface, a draft mechanism for creating an air flow through the hole and at least one air moving mechanism for creating a tangential flow that influences the draft air flow into a swirling flow.

2. The system of claim 1, wherein the first surface is a ground surface.

3. The system of claim 1, wherein the second surface is a flat surface that is positioned generally parallel to the first surface.

4. The system of claim 1, wherein the hole in the second surface is a circular hole.

5. The system of claim 1, wherein the second surface is a generally circular surface and wherein the hole is generally circular and has a diameter that is about half of a diameter of the second surface.

6. The system of claim 1, wherein the draft mechanism is at least one fan positioned in the hole in the second surface and orienting for producing a substantially vertical updraft air flow through the hole.

7. The system of claim 1, wherein the draft mechanism is an array of fans positioned in the hole in the second surface and oriented for producing a substantially vertical updraft air flow through the hole.

8. The system of claim 7, wherein the array is selected from the group consisting of a hexagonal array and a square array.

9. The system of claim 1, wherein the second surface has a top side and a bottom side, wherein the bottom side is closest to the first surface and further comprising a duct extending upward from the top side of the second surface around a perimeter of the hole.

10. The system of claim 1, wherein the draft mechanism is a burner positioned around the hole in the second surface and oriented for producing a substantially vertical updraft air flow through the hole.

11. The system of claim 10, wherein a position of the burner is selected from the positions consisting of a position above the hole, a position below the hole and a position substantially inside the hole.

12. The system of claim 1, wherein the second surface has a top side and a bottom side, where the bottom side of the second surface is closest to the first surface, and wherein the draft mechanism is at least one high speed blower positioned adjacent the hole above the top side for drawing the air upward through the hole.

13. The system of claim 12, wherein the at least one blower is at least one jet engine.

14. The system of claim 12, further comprising turning vanes positioned above the hole rear that at least one blower for directing air flow from the blower upward.

15. The system of claim 1, wherein the at least one air moving mechanism is an array of fans.

16. The system of claim 15, wherein each fan in the array is angled at about 45 degrees relative to a line from the fan to a center of the hole.

17. The system of claim 15, wherein the array of fans is arranged asymmetrically around the updraft air flow.

18. The system of claim 1, further comprising a first set of tangential fans positioned between the first surface and the second surface.

19. The system of claim 18, wherein the first set of fans is arranged in a generally circular pattern.

20. The system of claim 18, wherein the first set of fans are asymmetrically arranged in a generally arc-shaped configuration.

21. The system of claim 18, wherein the first set of fans are asymmetrically arranged in a generally arc-shaped, inwardly spiraling configuration.

22. The system of claim 18, further comprising a second set of fans positioned between the first set of fans and the first surface.

23. The system of claim 22, wherein the second set of fans is positioned about half way between the first surface and the second surface, and wherein the first set of fans is positioned close to the first surface.

24. The system of claim 18, wherein the fans are angled upward and further comprising at least one deflector positioned in front of the fans for directing air streams from the fans into a fan shape.

25. The system of claim 24, wherein the directors are selected from the group consisting of louvers and vanes.

26. The system of claim 1, wherein the second surface further comprises a plenum, wherein the draft mechanism is positioned underneath the plenum, and further comprising columns extending downward from the plenum for delivering a circulated air flow to the area between the first and second surfaces, vents positioned in the columns for imparting a swirled draft between the first and second surfaces and an air exhaust positioned at the top of the plenum.

27. The system of claim 26, wherein the vents are selected from the group consisting of holes in surfaces of the columns, adjustable vanes and fixed vanes.

28. The system of claim 26, further comprising additional air movers positioned in or on the columns for altering air flow distribution.

29. The system of claim 26, further comprising obstructor valves positioned in the columns for adjusting air flow patterns.

30. The system of claim 29, wherein the obstructor valves are selected from the group consisting of butterfly valves and shutters.

31. A method for generating tornadoes or other vortex phenomena in an open air, free space environment comprising the steps of positioning above a first surface a second surface having a hole, creating an updraft flow through the hole in the second surface, drawing external air in the updraft flow, creating a swirling flow by affecting the updraft flow with tangential flows from air moving generators and exhausting at least part of the swirling flow to the open environment after the swirling flow exits the hole.

32. The method of claim 31, wherein the creating an updraft flow step further comprises placing at least one fan near the hole, the positioning being selected from the group of steps consisting of positioning the at least one fan above the hole, positioning the at least one fan below the hole and positioning the at least one fan inside the hole.

33. The method of claim 31, wherein the creating an updraft flow step further comprises positioning step is selected from the group of steps consisting of positioning the burner above the hole, positioning the burner below the hole and positioning the burner inside the hole.

34. The method of claim 31, wherein the creating an updraft flow step further comprises positioning at least one blower above the top side of the second surface adjacent the hole and orienting directors above the hole for directing the air flow from the at least one blower upward.

35. The method of claim 31, wherein the second surface is a plenum, and further comprising recirculating part of the updraft air flow, the recirculating step further comprising extending multiple return columns downward from the plenum towards the first surface, directing part of the updraft air flow through the plenum and down the columns, and returning the part of the updraft air flow to an open area between the first surface and the second surface through vents in the columns.

36. The method of claim 35, wherein the recirculating step further comprises delivering tangential air flow to the updraft air flow at an angle generally perpendicular to the updraft flow.

37. The method of claim 35, wherein the recirculating step further comprises altering tha ir flow distribution in the columns.

38. The method of claim 35, wherein the recirculating step further comprises adjusting air flow patterns, the adjusting step further comprising controlling obstructers positioned in the columns for permitting or retarding air passage.

39. The method of claim 31, wherein the step of creating a swirling flow further comprises positioning a first set of fans between the first and second surfaces and imparting an asymmetrical, tangential flow on the updraft air flow.

40. The method of claim 39, wherein the first set of fans are positioned near the floor, and further comprising placing a second set of fans between the first set of fans and the second surface and imparting a second tangential flow on the updraft air flow.

41. The method of claim 40, wherein placing the second set of fans further comprises positioning the second set of fans on supports at a point about halfway between the first and second surfaces.

42. The method of claim 31, further comprising visualizing the swirling flow.

43. The method of claim 42, wherein the visualizing step is selected from the group consisting of the step of spraying a mist into the swirling flow, the step of introducing a flammable substance into the swirling flow and igniting the swirling flow, and the step of introducing already burning substances into the swirling flow.

44. The method of claim 42, wherein the visualizing step further comprises delivering a mist into the swirling flow, wherein the mist is selected from the group consisting of solid particles such as dust and liquid droplets.

45. The method of claim 42, wherein visualizing the swirling flow further comprises introducing a luminous substance into the swirling flow, wherein the substance is a solid, liquid or gaseous substance, and wherein the substance is selected from the group consisting of a self-luminous substance and an externally excitable.

46. The method of claim 42, wherein visualizing the swirling flow further comprises introducing a luminous, externally excitable substance into the swirling flow and exciting the substance, the exciting step further comprising shining ultraviolet light on the substance, and wherein the substance further comprises a fluorescent dye.

47. The method of claim 31, wherein the creating an upward flow step further comprises igniting a pool of flammable liquid and surrounding the pool with fans oriented to create a swirling, upward flow.

48. The method of claim 31, wherein the creating an updraft flow step further comprises creating a difference in buoyancy or density of a working fluid.

49. The method of claim 48, wherein the creating a difference in density further comprises changing a temperature of the updraft flow.

50. The method of claim 49, wherein the changing a temperature further comprises heating the updraft flow for right side up flows and cooling the updraft flow for upside down flows.

51. The method of claim 49, wherein changing the temperature further comprises electrically heating the working fluid of the flow.

52. The method of claim 48, wherein the creating a difference in density further comprises mixing a second different fluid of differing density.

53. The method of claim 52, wherein the working fluid is water and the second fluid is air bubbles.

54. The method of claim 31, further comprising introducing or removing fog, smoke or other visualizing medium into the swirling flow for revealing or concealing a person or object.

55. The method of claim 31, wherein the providing an upward draft further comprises applying electrostatic forces or magnetic forces.

56. A method for generating tornadoes or other vortex phenomena comprising the steps of creating an updraft flow, drawing external air into the updraft flow, creating a swirling flow by effecting the updraft flow with tangential flows from air moving generators and exhausting at least part of the swirling flow to the open environment.

57. The method of claim 56, wherein the creating an updraft flow comprises providing a generator for creating the flow.

58. The method of claim 56, wherein the creating an updraft flow comprises providing a burner for creating the flow.

59. The method of claim 56, further comprising the step of providing at least one blower and providing directors for orienting air flow from the at least one blower upward.

60. The method of claim 56, further comprising recirculating portions of the updraft air flow by extending multiple return columns in an opposite flow direction of the updraft flow, directing the portions of the updraft air flow along the columns, and returning the portions of the updraft air flow to an open area.

61. The method of claim 60, wherein the recirculating step further comprises delivering tangential air flow to the updraft air flow.

62. The method of claim 61, wherein the delivering tangentially comprises delivering at an angle generally perpendicular to the updraft flow.

63. The method of claim 61, wherein the recirculating step further comprises adjusting air flow patterns by adjusting obstructors positioned in the columns for permitting or retarding air passage.

64. The method of claim 56, wherein the step of creating a swirling flow further comprises positioning the generators along locations for imparting an asymmetrical, tangential flow to the updraft air flow.

65. The method of claim 64, wherein the providing the generators comprises providing a first set of fans having at least one fan for imparting a first tangential flow to the updraft flow.

66. The method of claim 65, wherein the providing generators further comprises providing a second set of fans having at least one fan, wherein the first set of fans are positioned at one level and the second set of fans are positioned at a second level for imparting a second tangential flow to the updraft air flow.

67. The method of claim 66, wherein providing the second set of fans further comprises positioning the second set of fans on supports.

68. A method for generating tornadoes or other vortex phenomena comprising the steps of creating an updraft flow, drawing external air into the updraft flow, creating a swirling flow by effecting the updraft flow with tangential flows from air moving generators and visualizing the swirling flow.

69. The method of claim 68, wherein the visualizing step further comprises the step of spraying a mist into the swirling flow.

70. The method of claim 69, wherein the spraying a mist into the swirling flow comprises the step of providing particulate matter as the mist.

71. The method of claim 70, wherein the particulate matter is selected from a group consisting of dust particles and liquid droplets.

72. The method of claim 68, wherein the visualizing step further comprises the step of introducing a flammable substance into the swirling flow and igniting the substance.

73. The method of claim 68, wherein the visualizing step further comprises the step of supplying burning substances into the swirling flow.

74. The method of claim 68, wherein visualizing the swirling flow further comprises introducing a luminous substance into the swirling flow.

75. The method of claim 74, wherein the luminous substance is selected from a solid, liquid or gaseous substance.

76. The method of claim 75, wherein the luminous substance is selected from a group consisting of a self-luminous substance and an externally excitable substance.

77. The method of claim 68, wherein the visualizing the swirling flow further comprises introducing a luminous, externally excitable substance into the swirling flow and exciting the substance.

78. The method of claim 77, wherein the exciting step further comprises shining ultraviolet light on the substance.

79. The method of claim 77, wherein the substance further comprises a fluorescent dye.

* * * * *